United States Patent
Ness

(10) Patent No.: US 12,306,857 B2
(45) Date of Patent: May 20, 2025

(54) SYSTEMS AND METHODS FOR QUERY TERM ANALYTICS

(71) Applicant: Proofpoint, Inc., Sunnyvale, CA (US)

(72) Inventor: Jeremiah Ness, Toronto (CA)

(73) Assignee: PROOFPOINT, INC., Sunnyvale, CA (US)

( * ) Notice: Subject to any disclaimer, the term of this patent is extended or adjusted under 35 U.S.C. 154(b) by 37 days.

(21) Appl. No.: 17/217,731

(22) Filed: Mar. 30, 2021

(65) Prior Publication Data
US 2022/0318284 A1 Oct. 6, 2022

Related U.S. Application Data

(60) Provisional application No. 63/133,043, filed on Dec. 31, 2020.

(51) Int. Cl.
| | | |
|---|---|---|
| *G06F 7/00* | (2006.01) | |
| *G06F 11/30* | (2006.01) | |
| *G06F 11/34* | (2006.01) | |
| *G06F 16/31* | (2019.01) | |
| *G06F 16/332* | (2019.01) | |
| *G06F 16/383* | (2019.01) | |

(52) U.S. Cl.
CPC ...... *G06F 16/3323* (2019.01); *G06F 11/3086* (2013.01); *G06F 11/3452* (2013.01); *G06F 16/319* (2019.01); *G06F 16/383* (2019.01)

(58) Field of Classification Search
CPC ............ G06F 16/3323; G06F 11/3086; G06F 11/3452; G06F 16/319; G06F 16/383; G06F 16/242; G06F 16/2452; G06F 16/2458
See application file for complete search history.

(56) References Cited

U.S. PATENT DOCUMENTS 5,704,060 A * 12/1997 Del Monte ............. H03M 7/40
704/7
6,026,398 A * 2/2000 Brown .................. G06F 16/319
707/999.005

(Continued)

OTHER PUBLICATIONS

European Search Report issued for European Patent Application No. 21167940.2, mailed Sep. 13, 2021, 9 pages.

(Continued)

*Primary Examiner* — Mohammed R Uddin
(74) *Attorney, Agent, or Firm* — Sprinkle IP Law Group

(57) ABSTRACT

A query term analytics system receives a search query from a user device. The system has an engine enhanced with the ability to track query terms using in-memory counters and leveraging an inverted index of content stored in a content repository. The search query is run on the content and, contemporaneously the engine performs a query term analysis on the query terms to produce query term analytics. The query term analysis includes an impact analysis that determines an impact of removing a keyword or keyword criteria from the search query. A compressed bitset can be used to indicate whether a keyword is in the content. The engine can accumulate statistics using the in-memory counters while the search query is being processed. Using the statistics thus accumulated, a query term analytics report is generated and provided to the user device for presentation on the user device.

20 Claims, 7 Drawing Sheets

(56) References Cited

U.S. PATENT DOCUMENTS

| | | | | |
|---|---|---|---|---|
| 6,038,560 | A * | 3/2000 | Wical | G06F 16/34 |
| | | | | 707/999.005 |
| 7,831,609 | B1 * | 11/2010 | Alexander | G06F 16/9566 |
| | | | | 707/765 |
| 8,498,980 | B2 * | 7/2013 | Cochran | G06F 16/24535 |
| | | | | 707/714 |
| 8,694,503 | B1 * | 4/2014 | Naga | G06F 16/128 |
| | | | | 707/736 |
| 9,075,799 | B1 * | 7/2015 | Tellefsen | G06F 16/319 |
| 9,152,667 | B1 * | 10/2015 | Wu | G06F 16/3331 |
| 9,449,080 | B1 * | 9/2016 | Zhang | G06F 16/3346 |
| 9,552,412 | B1 * | 1/2017 | Lowe | G06F 16/3325 |
| 10,318,630 | B1 * | 6/2019 | Kesin | G06F 40/216 |
| 10,452,691 | B2 * | 10/2019 | Liu | G06F 16/951 |
| 10,504,139 | B1 * | 12/2019 | Heiser | G06Q 30/0276 |
| 10,810,236 | B1 * | 10/2020 | Zhao | G06F 16/334 |
| 2001/0000192 | A1 * | 4/2001 | Gonzalez | G06F 16/00 |
| 2003/0212673 | A1 * | 11/2003 | Kadayam | G06F 16/9532 |
| 2004/0019677 | A1 * | 1/2004 | Fukumoto | G06F 11/3447 |
| | | | | 709/224 |
| 2004/0068488 | A1 * | 4/2004 | Dettinger | G06F 16/2425 |
| 2005/0131876 | A1 * | 6/2005 | Ahuja | G06F 16/9532 |
| 2005/0209951 | A1 * | 9/2005 | Aron | G06Q 30/06 |
| | | | | 705/37 |
| 2006/0224593 | A1 * | 10/2006 | Benton | G06F 16/951 |
| 2009/0094262 | A1 * | 4/2009 | Marvit | G06F 16/367 |
| 2009/0157669 | A1 * | 6/2009 | Nakayama | G06F 16/951 |
| | | | | 707/999.005 |
| 2009/0193352 | A1 * | 7/2009 | Bunn | G06F 16/954 |
| | | | | 715/780 |
| 2009/0292677 | A1 * | 11/2009 | Kim | G06F 16/958 |
| 2010/0185661 | A1 * | 7/2010 | Malden | G06Q 10/06 |
| | | | | 707/769 |
| 2010/0250573 | A1 * | 9/2010 | Mayer | G06Q 30/02 |
| | | | | 707/E17.014 |
| 2011/0213767 | A1 * | 9/2011 | Fontoura | G06Q 30/08 |
| | | | | 707/E17.014 |
| 2011/0295834 | A1 * | 12/2011 | Augustin | G06F 16/2453 |
| | | | | 707/E17.131 |
| 2012/0296891 | A1 * | 11/2012 | Rangan | G06F 16/3347 |
| | | | | 707/E17.014 |
| 2013/0151534 | A1 * | 6/2013 | Luks | G06F 16/41 |
| | | | | 707/742 |
| 2013/0262471 | A1 * | 10/2013 | Whitman | G06F 16/432 |
| | | | | 707/742 |
| 2015/0074007 | A1 * | 3/2015 | Gabriel | G06F 16/90328 |
| | | | | 705/311 |
| 2015/0169582 | A1 * | 6/2015 | Jain | G06F 16/3332 |
| | | | | 707/748 |
| 2016/0147872 | A1 * | 5/2016 | Agarwalla | G06F 16/3338 |
| | | | | 707/713 |
| 2016/0239487 | A1 * | 8/2016 | Potharaju | G06F 16/24578 |
| 2016/0261701 | A1 * | 9/2016 | Dhawan | H04N 19/91 |
| 2017/0024461 | A1 * | 1/2017 | Mac an tSaoir | G06F 16/334 |
| 2017/0293677 | A1 * | 10/2017 | Boguraev | G06F 16/24578 |
| 2018/0089316 | A1 * | 3/2018 | Ganot | G06F 16/289 |
| 2019/0102413 | A1 * | 4/2019 | Hsu | G06F 16/2237 |
| 2020/0034357 | A1 * | 1/2020 | Panuganty | G06F 16/243 |
| 2022/0019581 | A1 * | 1/2022 | Minami | G06V 30/347 |

OTHER PUBLICATIONS

Debabrata et al., "Dynamic Faceted Search for Discovery-Driven Analysis," Proceedings of the 17th ACM Conference on Information and Knowledge Mining, 2002, ACM Press, pp. 3-12.

Examination Report issued by the European Patent Office for European Patent Application No. 21167940.2, mailed Nov. 27, 2023, 6 pages.

* cited by examiner

KEYWORDS

POTENTIAL MATCHES
Potential matches return items whose content was not fully indexed but matches other non-keyword criteria.

| Keywords | Items in Result | In Node | Impact Analysis of Removing Keyword Criteria | |
|---|---|---|---|---|
| | | | Updated Results | Difference Vs Original |
| Potential Matches | 1000 | 800 | 9,000 | 8,000 ↑ |

KEYWORD CRITERIA A
Location: Header, Subject, Body, Attachment

| Keywords | Items in Result | In Node | Impact Analysis of Removing Keyword | |
|---|---|---|---|---|
| | | | Updated Results | Difference Vs Original |
| 1. social | 1000 | 800 | 900 | 100 ↓ |
| 2. distance | 1000 | 1000 | 500 | 500 ↓ |
| 3. space OR time | 1000 | 1000 | 500 | 500 ↓ |
| 3.1. space | 500 | 500 | 500 | 500 ↓ |
| 3.2. time | 400 | 400 | 400 | 600 ↓ |
| 4. covid (exclusion) | 0 | 1000 | 900 | 100 ↓ |
| 5. corona (exclusion) | 0 | 1000 | 500 | 500 ↓ |

FIG. 4A

MAILBOXES

| | Impact Analysis of Removing Mailbox Criteria | |
|---|---|---|
| | Updated Results | Difference Vs Original |
| | 9,000 | 8,000 ↑ |

| | | Impact Analysis of Removing Inclusion | |
|---|---|---|---|
| Mailbox | Items in Result | Updated Results | Difference Vs Original |
| 1. Auser6<Auser6@ex10ad03sd.qa> | 800 | 900 | 100 ↓ |
| 2. Auser8<Auser8@ex10ad03sd.qa> | 400 | 500 | 500 ↓ |
| 3. Auser10<Auser10@ex10ad03sd.qa> | 200 | 500 | 500 ↓ |
| 4. Auser12<Auser12@ex10ad03sd.qa> | 500 | 800 | 200 ↓ |
| 5. Dept1User4<Dept1User4@ex10ad03sd.qa> | 600 | 900 | 100 ↓ |

FIG. 4C

SYSTEMS AND METHODS FOR QUERY TERM ANALYTICS

CROSS-REFERENCE TO RELATED APPLICATION(S)

This application claims a benefit of priority under 35 U.S.C. § 119(e) from U.S. Provisional Application No. 63/133,043, filed Dec. 31, 2020, entitled "SYSTEMS AND METHODS FOR QUERY TERM ANALYTICS," which is incorporated by reference herein for all purposes.

FIELD OF THE INVENTION

This invention relates generally to search analytics. More particularly, this invention relates to systems, methods, and computer program products for providing query term analytics contemporaneously with a search, useful for eDiscovery and archiving purposes.

BACKGROUND OF THE RELATED ART

When performing a search, for instance, through an archive of messages, a user is usually confronted with potentially unlimited search terms (e.g., keywords, dates, etc.). A search term may return a huge number of hits or only few results. The user generally does not know which search terms might be the most effective in getting the most relevant results.

What is needed, therefore, is a computer implemented solution that can programmatically analyze search terms in a search query contemporaneously with the search and delivery meaningful, impactful, timely information about the search terms to a user conducting the search, for instance, how many search results would return if a particular keyword were removed from the search query. Embodiments of an invention disclosed herein can address this need and more.

SUMMARY OF THE DISCLOSURE

A goal of the invention disclosed herein is to provide a computer-implemented solution that can, contemporaneous with a search query being run against content stored in a data storage location, repository, content server, etc., analyze the results of the search query in real time (e.g., while the search query is being executed by a search engine, a query processing engine, or the like). According to embodiments, the computer-implemented solution is realized in systems, methods, and computer program products for performing a real-time query term analysis of a search query contemporaneously with the search query being run against content of interest and for providing information about terms in the search query, the analyzing including performing an impact analysis of removing keyword criteria.

The analytics produced from the real-time query term analysis are then provided, via a user interface or dashboard, to a user. The analytics include information about the effect of individual search terms and/or criteria in the search query (e.g., how many results would appear if a keyword were excluded from the query).

In some embodiments, a method may include receiving, by a query term analytics system from a user device, a search query containing query terms. The query term analytics system may have a processor, a query processing engine executing on the processor, a computer memory communicatively connected to the query processing engine, counters in the computer memory, and a query term analytics report generator. In some embodiments, the method may further include processing, by the query processing engine, the search query on content stored in a content repository and, contemporaneously with the processing, performing a query term analysis on the query terms in the search query. The content may comprise a document or an electronic message. The query term analysis produces query term analytics on the query terms in the search query.

In some embodiments, the query processing engine provides the query term analytics on the query terms in the search query to the query term analytics report generator which, in turn, generates a query term analytics report on the query terms in the search query. The query term analytics report is then provided to the user device for presentation on the user device.

In some embodiments, performing the query term analysis can include performing an impact analysis which, in turn, can include determining an impact of removing a query term, a keyword, or keyword criteria from the search query. In some embodiments, performing the query term analysis can include keeping track of the query terms in the search query using the counters in the memory and leveraging an inverted index of the content stored in the content repository. In some embodiments, keeping track of the query terms in the search query includes updating a compressed bitset to indicate whether the content has a particular query term, a particular keyword, or particular keyword criteria.

In some embodiments, the search query can include arbitrary Boolean logic. Thus, in some embodiments, performing the query term analysis can include accumulating statistics using the counters in the computer memory as a query term or set algebra in the search query is being processed. In some embodiments, the query term analytics report is generated using the statistics thus accumulated.

One embodiment may comprise a system having a processor and a memory and configured to implement the method disclosed herein. One embodiment may comprise a computer program product that comprises a non-transitory computer-readable storage medium which stores computer instructions that are executable by a processor to perform the method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIGS. 4A-4D show example aspects of a query term analytics report presented through a user interface or search application according to some embodiments.

DETAILED DESCRIPTION

The invention and the various features and advantageous details thereof are explained more fully with reference to the exemplary, and therefore non-limiting, embodiments that are illustrated in the accompanying drawings and detailed in the following description. Descriptions of known programming techniques, computer software, hardware, operating platforms, and protocols may be omitted so as not to unnecessarily obscure the disclosure in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
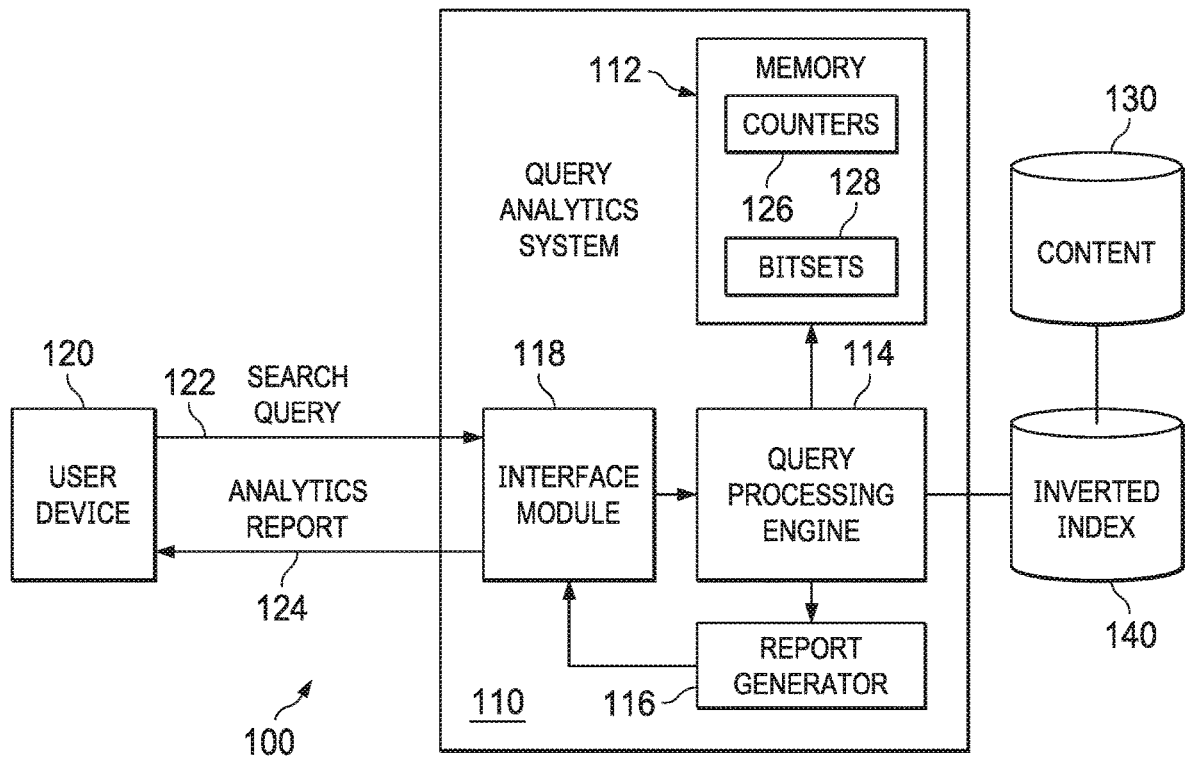
FIG. 1 depicts a diagrammatical representation of an example of a query term analytics system according to some embodiments.
Figure 2:
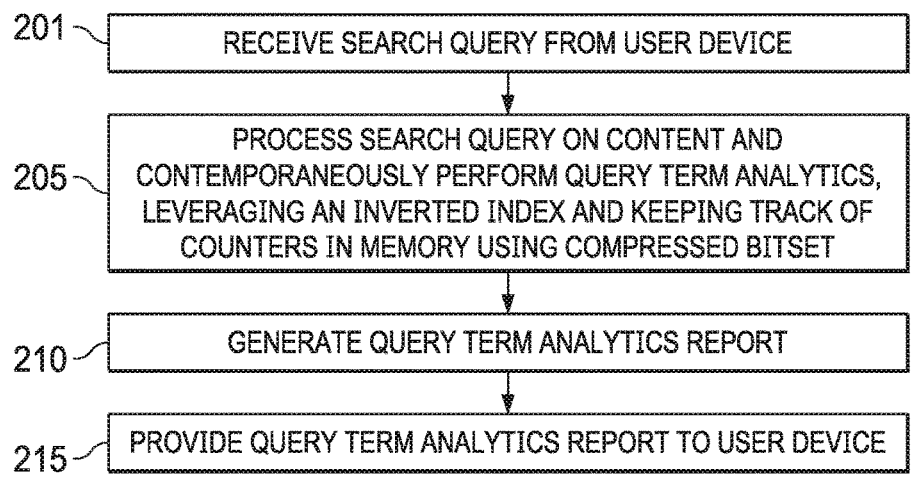
FIG. 2 is a flow chart illustrating an example of a method for query term analytics according to some embodiments.

FIG. 1 depicts a diagrammatical representation of an example of a query term analytics system 110 operating in a network computing environment 100. In some embodiments, the query term analytics system 110 has a computer memory 112, a query processing engine 114, a report generator 116, and an interface module 118. Referring to FIG. 2, which is a flow chart showing an example of a method 200 for query term analytics, the query term analytics system 110 is operable to receive a search query 122 from a user device 120 to search content (e.g., electronic messages) stored in a data storage or content repository 130 (201). The query processing engine 114 is adapted for processing the search query 122 received from the user device 120 and performing a query term analysis contemporaneously, leveraging an inverted index 140 and keeping track of counters 126 and bitsets 128 for each of the terms of the query in the computer memory 112 (205). A bitset is a space-efficient data structure represented by a fixed-size sequence of N bits and stores boolean values of 0 or 1. For instance, zero represents that a bit is unset or that the value is false and one represents that a bit is set or that the value is true. Bitsets can be operated on using logic operators and converted to and from strings and integers. Bitsets are known to those skilled in the art and thus are not further described herein.

The inverted index 140 may be created and/or updated based on the content stored in the content repository 130 independently of the query term analytics system 110. The report generator 116 is configured for generating a query term analytics report 124 based on the query term analysis of the query terms in the search query. The interface module 118 is configured for generating a user interface for presenting the query term analytics report 124 on the user device 120.

As described above, in some embodiments, the query term analytics system 100 leverages the inverted index 140 in performing the query term analysis. An inverted index is a database index that stores mapping information about how stored content, such as words, numbers, etc., maps to respective locations in a document or documents.

For instance, an inverted index may assign an identifier ("1") to the term "social" and indicates that the term "social" can be found in Document 1 and 2. In some implementations, an inverted index may further indicate the position of the term "social" in a document. For instance, suppose Document 1 begins with "Social distancing . . . " in which the term "social" is at the first position. Accordingly, the inverted index may indicate the position of the term "social" as "1:1." Inverted indexes are known to those skilled in the art and thus are not further described herein.

As alluded to above, the inverted index 140 may be created independently of the query term analytics system 110. That is, the invention disclosed herein does not modify an inverted index. Rather, the invention modifies an engine that is responsible for processing search queries (e.g., a query processing engine, a search engine, etc.) to enhance its abilities.

As a non-limiting example, the source code of a search engine is modified so that, when the search engine executes a search query from a user device, it also keeps track (e.g., using counters 126 and bitsets 128) of a count and effects of each keyword in an inverted index and aggregates the keywords. Specifically, for each term in the query, the search engine tracks the effect on the results if the particular term were removed, the effect on the results if the particular term's siblings were removed, and the effect on the results if the particular term were ANDed with all the other criteria in the query. As illustrated in the example of FIG. 1, the keyword counters used by the search engine are kept in memory and not persisted. The use of memory space for these counters is marginal (e.g., 1 MB).

In some embodiments, an efficient representation (e.g., a compressed bitset, also known as a bitmap) is used to represent whether a document has a particular keyword/criteria or not. Those skilled in the art appreciates that the bitset data structure is an efficient way to represent sets of integers and supports set operations such as union, difference, and intersection. Bitset compression techniques and data structures are known to those skilled in the art and thus are not further described herein. The stored counters are then used (e.g., by the report generator 116) to produce a query term analytics report in real time, contemporaneously with executing the search query in response to receiving the search query from the user device (210). The query term analytics report 124 is then presented on the user device 120 through a user interface generated by the interface module 118 (215).

As compared to an unmodified full text search engine, the processing time needed for a modified query processing engine disclosed herein to aggregate the counters in memory is insignificant. The analytics report is then presented, for instance, through a user interface or a dashboard, to the user who is conducting the search.

In embodiments disclosed herein, a query processing engine is modified or otherwise extended for analyzing search queries, including complicated ones such as those containing multiple terms, arbitrary Boolean logic (e.g., "and," "not," "and not", etc., for instance, "documents containing, bank AND (payment OR bill)"). While each search term is performed individually, statistics are accumulated and stored in memory contemporaneously with the search, regardless of the number of search terms, even with Boolean search parameters inserted. The accumulated statistics are then used to produce a query term analytics report as the search is being conducted. By modifying the engine code to leverage the inverted index (e.g., by adding application programming interface (API) calls to the engine to see what changing search parameters would do to impact query terms) and utilize in-memory counters to keep track of keywords, the invention can eliminate the need to search multiple times for each term in a search query in order to get the counts.

By running the query term analytics contemporaneously with a search and providing a query term analytics report in real time, the invention can also eliminate the need for faceted search. Faceted search is a search navigation technique that allows a user to narrow down search results by applying multiple filters based on faceted classification of the terms. Facets are often derived by analyzing the text of a document using entity extraction or by extracting existing fields of a database. The facets are then classified and stored, for instance, in an index, for later use in filtering search results returned by a search engine.

With the invention, information about each term in a search query is analyzed and provided to a user contemporaneous with the search without having to rely on facets. Because the invention does not rely on facets, a search engine modified or otherwise enhanced according to the invention can scale better than a traditional full text search engine that utilizes facets. Consider datasets that include log files, HTTP headers, messages with tokens, spreadsheets with equations, etc. The total number of unique keywords can be in upwards of 10 billion. It can be computational expensive, time-consuming, and practically impossible to derive, classify, and store facets for such a massive amount of unique keywords. The invention utilizes existing data structures in the search queries, so there is no need to derive, classify, and store facets for query terms.

Figure 3:
FIG. 3 shows a portion of an example of a query term analytics report on a complex search query with query terms according to some embodiments.

FIG. 3 shows a portion of an example of a query term analytics report 300 on a complex search query according to some embodiments. In this example, the search query includes query terms "social," "distance," and ("space" or "time), but not "covid" or "corona." The search query also includes keyword criteria that specify, for instance, location(s) where the query terms are found (e.g., in the header, subject line, body, and/or attachment of an email or emails). The search query may also specify attachment type(s), mailbox(es), mail flow, case folder(s), sender(s), and/or recipient(s) for the search.

In some embodiments, a query term analytics system, which can operate in an enterprise computing environment or in a cloud computing environment, receives a search query through, for instance, a search interface or an application on a user device. In some embodiments, the search query may first be received by an interface module (e.g., the interface module 118) which, in turn, communicates the search query to a modified query processing engine.

As discussed above, as the query processing engine executes the search query, it tracks each keyword in the inverted index associated with the stored content (e.g., email messages, documents, e.g.,) and stores the respective counts in memory. For efficiency and scalability, a data structure referred to as a compressed bitset is used to represent whether a document or message has a particular keyword/criterion or not. As the query processing engine executes the search query, it also runs analytics on the query terms using the counters stored in memory and calls a report generator to generate a query term analytics report on the analytics, which is then provided to the user device for presentation on the user device through, for instance, the search interface or application so that the user who is conducting the search can have details about the effectiveness of the search query in real time.

FIGS. 4A-4D show example aspects of a query term analytics report presented through a user interface or search application according to some embodiments. In some embodiments, performing a query term analysis may include performing an impact analysis on the impact of removing a certain keyword from a search query. The impact analysis may include determining a number of items (e.g., "hits") if a particular keyword (e.g., "social") is excluded from or included in a search query. As a non-limiting example, this can be done by generating one or more search queries modified (e.g., deleting a keyword, adding a keyword, changing a keyword criterion, etc.) from the original search query received from a requesting computing device and making API call(s) with the modified one or more search queries to the content repository where the content is stored.

As shown in FIG. 4A, a query term analytics report can include the result, such as the number of hits, from the impact analysis with respect to keywords and/or keyword criteria in the search query. In this example, removing all the keyword criteria associated with the search query would result in an increase of 8,000 hits in return.

Figure 4B:
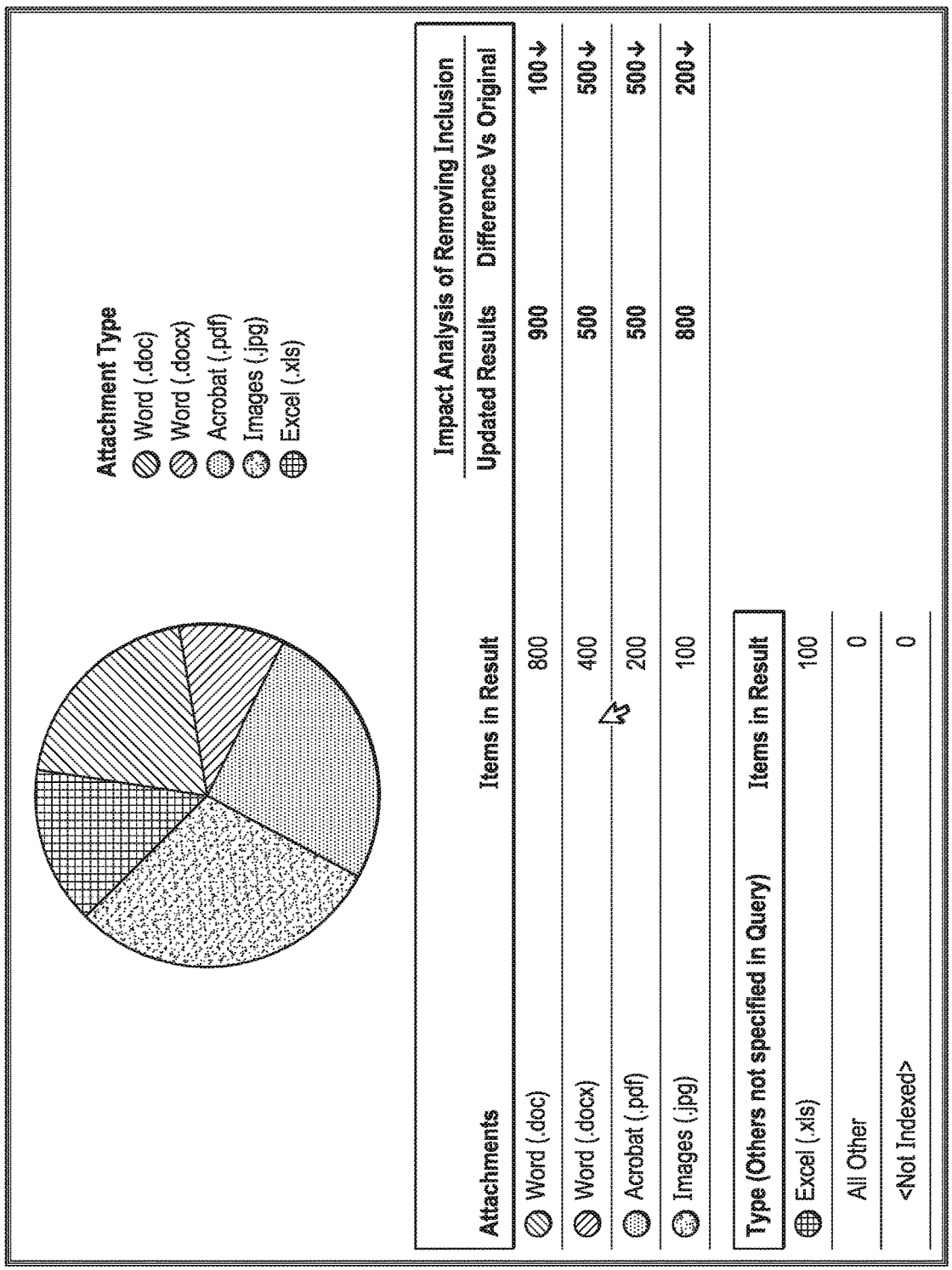
Figure 4D:
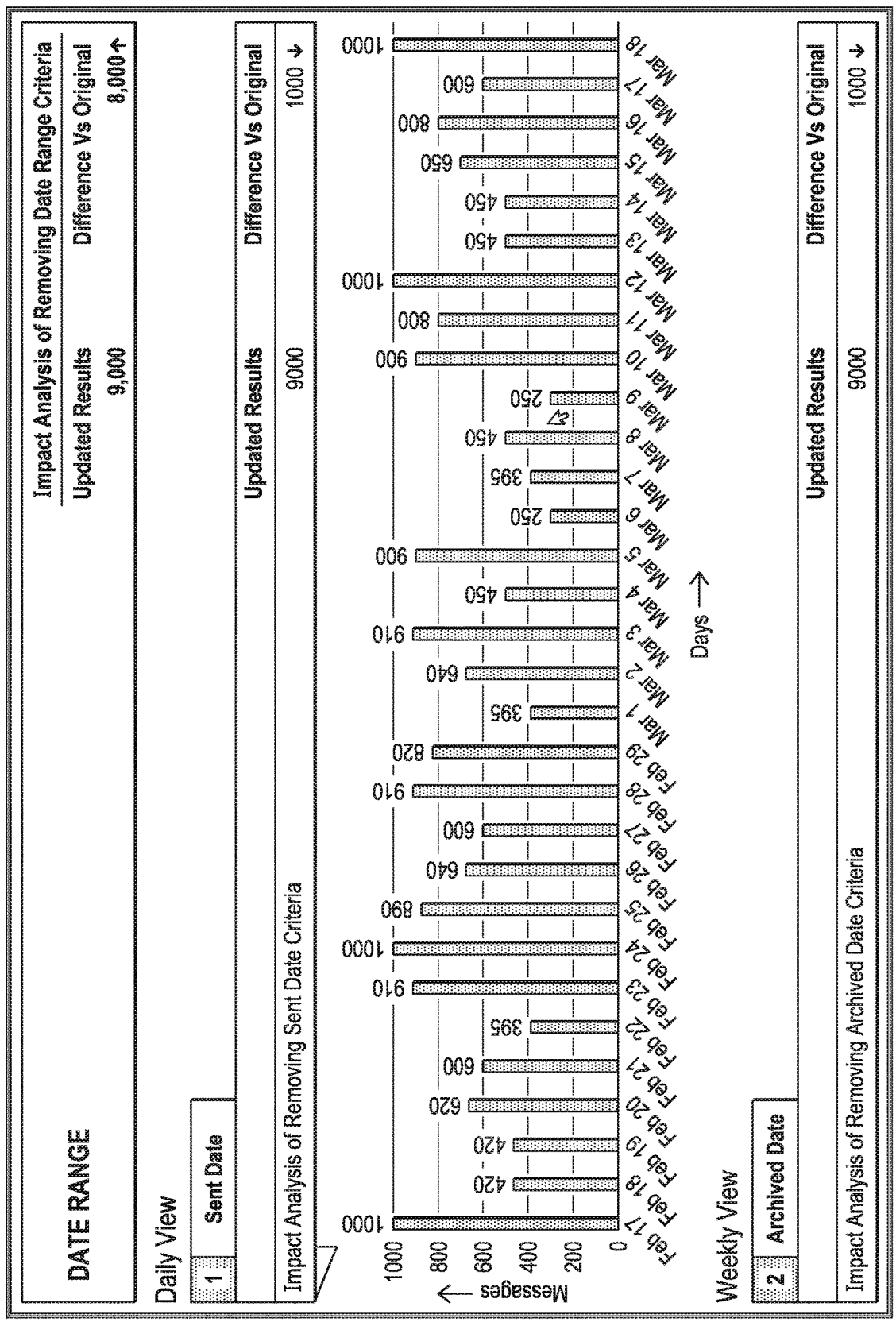

Additionally, the query term analytics report can include details of the analytics run on the search query, term by term and section by section, as exemplified in FIGS. 4B-4D. FIG. 4B shows the potential impact when the user has selected "has attachments" and "specific attachment types." FIG. 4C shows the potential impact when a particular mailbox is not included in the search. Suppose the search involves a period between two dates. FIG. 4D shows the potential impact (e.g., via a timeline) when the "sent" date is not included in the search.

According to an aspect of the invention, a query term analytics system disclosed herein can perform very efficiently, taking into consideration as to how to aggregate data without using too much memory and how much to hold in memory while doing the calculations. For instance, the query term analytics system considers a batch of documents at a time. The batch size is set so that the query processing engine does not need to hold all the hit results for all of the criteria for the entire corpus in memory at once.

The actual batch size is configurable and can vary from implementation to implementation, depending upon the size of the overall corpus of content to be searched and/or the number of search criteria involved (e.g., a couple hundreds of criteria to thousands of criteria). As a non-limiting example, the batch size can be determined by comparing the number of documents times the number of criteria with a threshold that represents available memory that can be allocated for use by the query processing engine.

The query term analytics system does not store values of what each document has. Instead, as described above, the query term analytics system utilizes an efficient representation (e.g., a compressed bitset) to indicate which document has a query term (e.g., "social") and which document does not.

Once the query term analytics system has the bitsets (e.g., a bitset for "social," a bitset for "distance," a bitset for "space," a bitset for "time," a bitset for "covid," a bitset for "corona," etc.) in memory, it can compute the numbers using the set algebra required in the search query. For instance, following the above example, the search query indicates that ("social" and "distance") requires an intersection operation and ("space" or "time) requires a union operation.

The query term analytics system performs all the work required for the search and produces a single count for the number of hits, all the while generating a per-term report. In this way, for an insignificant amount of time more than what a traditional full text search engine would take to execute the same search query, the query term analytics system can, in one pass, provide a significant amount of information on each of the query terms and criteria in the search query which, conventionally, would have taken a significant amount of time to perform multiple searches and analyze individually. In some embodiments, the query term analytics report on the query terms can be delivered at about the same time with the search results and the user can manipulate the query terms and/or criteria to see the impacts of changing parameters in real time through the analytics report.)

In some embodiments, the query processing engine can process a search query that contains arbitrary Boolean logic. The query processing engine uses the counters to keep track of the terms/criteria and compute bitsets as discussed above.

Figure 5:
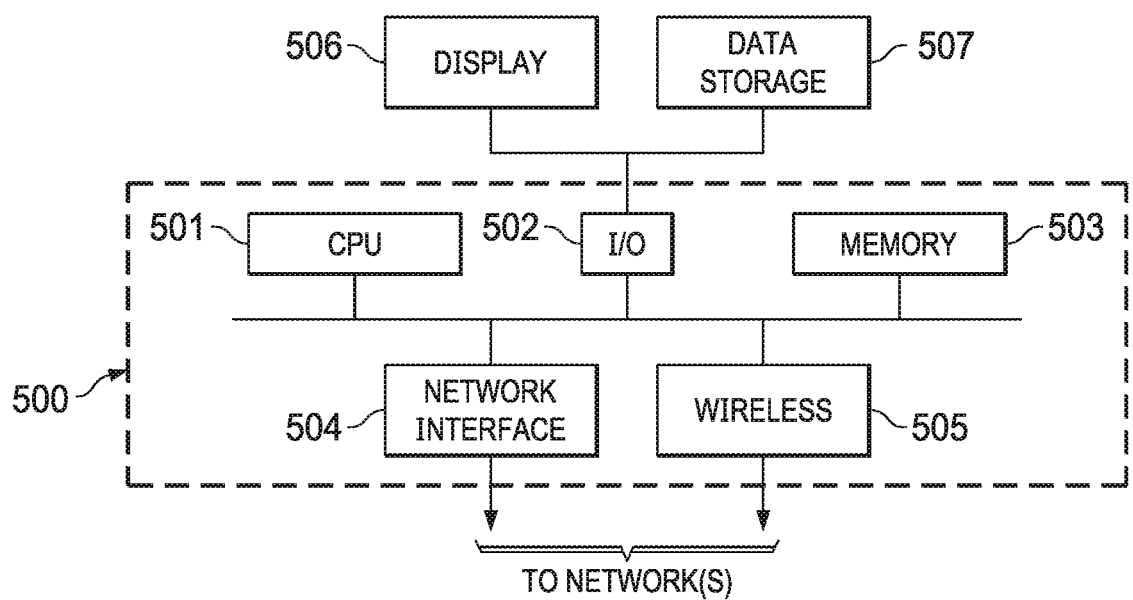
FIG. 5 depicts a diagrammatic representation of a data processing system for implementing a system according to some embodiments.

FIG. 5 depicts a diagrammatic representation of a data processing system for implementing a query term analytics system. As shown in FIG. 5, a data processing system 500 may include one or more central processing units (CPU) or processors 501 coupled to one or more user input/output (I/O) devices 502 and memory devices 503.

Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc.

Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals, or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:

receiving, by a query term analytics system from a user device, a search query containing query terms and keyword criteria, wherein the keyword criteria specify a location within content to be searched, the query term analytics system having a processor, a query processing engine executing on the processor, a computer memory communicatively connected to the query processing engine, counters in the computer memory, and a query term analytics report generator;

processing, by the query processing engine, the search query against content stored in a content repository;

contemporaneously with the processing and as the search query is being run against the content stored in the content repository, performing, by the query processing engine, a query term analysis by performing an impact analysis on the search query, wherein performing the impact analysis comprises:

modifying the search query by removing and adding at least one of a respective query term and keyword criteria of the search query, thereby generating one or more modified search queries, comprising keywords corresponding to the respective query terms in the modified search queries;

determining, during the execution of the search query, a number of hits in the inverted index for the keywords of each modified search query based on the keyword criteria of the corresponding modified search query, the query term analysis producing query term analytics including the number of hits on the keywords during execution of the search query;

providing, by the query processing engine to the query term analytics report generator, the query term analytics on the keywords and keyword criteria in the modified search queries, wherein the query term analytics are provided without further selection from the user device;

generating, by the query term analytics report generator based on the query term analytics, a query term analytics report describing the query term analytics for the modified search queries; and returning the search query results of the search query against the content stored in the content repository.

2. The method according to claim 1, wherein impact analysis includes determining a number of hits responsive to the query term, the keyword, or the keyword criteria being excluded from or included in the search query.

3. The method according to claim 1, wherein performing the query term analysis includes keeping track of the query terms in the search query using the counters in the memory and leveraging the inverted index of the content stored in the content repository.

4. The method according to claim 3, wherein keeping track of the query terms in the search query includes updating a compressed bitset to indicate whether the content has a particular query term, a particular keyword, or particular keyword criteria.

5. The method according to claim 1, wherein performing the query term analysis includes accumulating statistics using the counters in the computer memory as a query term in the search query is being processed and wherein the query term analytics report is generated using the statistics thus accumulated.

6. The method according to claim 1, further comprising:
providing the query term analytics report to the user device for presentation on the user device.

7. The method according to claim 1, wherein the content comprises a document or an electronic message.

8. A query term analytics system, comprising:
a processor;
a computer memory; and
stored instructions translatable by the processor for:
receiving, from a user device, a search query containing query terms and keyword criteria, wherein the keyword criteria specify a location within content to be searched;
processing the search query against content stored in a content repository;
contemporaneously with the processing and as the search query is being run against the content stored in the content repository, performing a query term analysis by performing an impact analysis on the search query, wherein performing the impact analysis comprises:
modifying the search query by removing and adding at least one of a respective query term and keyword criteria of the search query, thereby generating one or more modified search queries, comprising keywords corresponding to the respective query terms in the modified search queries;
determining, during the execution of the search query, a number of hits in the inverted index for the keywords of each modified search query based on the keyword criteria of the corresponding modified search query, the query term analysis producing query term analytics including the number of hits on the keywords during execution of the search query;

generating, based on the query term analytics, a query term analytics report describing the query term analytics for the modified search queries; and returning the search query results of the search query against the content stored in the content repository.

9. The query term analytics system of claim 8, wherein the impact analysis includes determining a number of hits responsive to the query term, the keyword, or the keyword criteria being excluded from or included in the search query.

10. The query term analytics system of claim 8, wherein performing the query term analysis includes keeping track of the query terms in the search query using the counters in the memory and leveraging the inverted index of the content stored in the content repository.

11. The query term analytics system of claim 10, wherein keeping track of the query terms in the search query includes updating a compressed bitset to indicate whether the content has a particular query term, a particular keyword, or particular keyword criteria.

12. The query term analytics system of claim 8, wherein performing the query term analysis includes accumulating statistics using the counters in the computer memory as a query term in the search query is being processed and wherein the query term analytics report is generated using the statistics thus accumulated.

13. The query term analytics system of claim 8, wherein the stored instructions are further translatable by the processor for:
providing the query term analytics report to the user device for presentation on the user device.

14. The query term analytics system of claim 8, wherein the content comprises a document or an electronic message.

15. A computer program product comprising a non-transitory computer-readable medium storing instructions translatable by a processor of a query term analytics system for:
receiving, from a from a user device, a search query containing query terms and keyword criteria, wherein the keyword criteria specify a location within content to be searched, the query term analytics system having a processor, a query processing engine executing on the processor, a computer memory communicatively connected to the query processing engine, counters in the computer memory, and a query term analytics report generator;
processing, by the query processing engine, the search query against content stored in a content repository;
contemporaneously with the processing and as the search query is being run against the content stored in the content repository, performing, by the query processing engine, a query term analysis by performing an impact analysis on the search query, wherein performing the impact analysis comprises:
modifying the search query by removing and adding at least one of a respective query term and keyword criteria of the search query, thereby generating one or more modified search queries, comprising keywords corresponding to the respective query terms in the modified search queries;
determining, during the execution of the search query, a number of hits in the inverted index for the keywords of each modified search query based on the keyword criteria of the corresponding modified search query, the query term analysis producing query term analytics including the number of hits on the keywords during execution of the search query;

providing the query term analytics on the keywords and keyword criteria in the modified search queries, wherein the query term analytics are provided without further selection from the user device;

generating, by the query term analytics report generator based on the query term analytics, a query term analytics report describing the query term analytics for the modified search queries; and returning the search query results of the search query against the content stored in the content repository.

16. The computer program product of claim 15, wherein the impact analysis includes determining a number of hits responsive to the query term, the keyword, or the keyword criteria being excluded from or included in the search query.

17. The computer program product of claim 15, wherein performing the query term analysis includes keeping track of the query terms in the search query using the counters in the memory and leveraging the inverted index of the content stored in the content repository.

18. The computer program product of claim 17, wherein keeping track of the query terms in the search query includes updating a compressed bitset to indicate whether the content has a particular query term, a particular keyword, or particular keyword criteria.

19. The computer program product of claim 15, wherein performing the query term analysis includes accumulating statistics using the counters in the computer memory as a query term in the search query is being processed and wherein the query term analytics report is generated using the statistics thus accumulated.

20. The computer program product of claim 15, wherein the stored instructions are further translatable by the processor for:

providing the query term analytics report to the user device for presentation on the user device.

* * * * *